W. B. HODGE.
APPARATUS FOR INDICATING AND REGULATING HUMIDITY.
APPLICATION FILED FEB. 7, 1913.

1,080,109.

Patented Dec. 2, 1913.

5 SHEETS—SHEET 1.

W. B. HODGE.
APPARATUS FOR INDICATING AND REGULATING HUMIDITY.
APPLICATION FILED FEB. 7, 1913.

1,080,109. Patented Dec. 2, 1913.
5 SHEETS—SHEET 3.

W. B. HODGE.
APPARATUS FOR INDICATING AND REGULATING HUMIDITY.
APPLICATION FILED FEB. 7, 1913.

1,080,109.

Patented Dec. 2, 1913.

5 SHEETS—SHEET 4.

W. B. HODGE.
APPARATUS FOR INDICATING AND REGULATING HUMIDITY.
APPLICATION FILED FEB. 7, 1913.
1,080,109.
Patented Dec. 2, 1913.
5 SHEETS—SHEET 5.
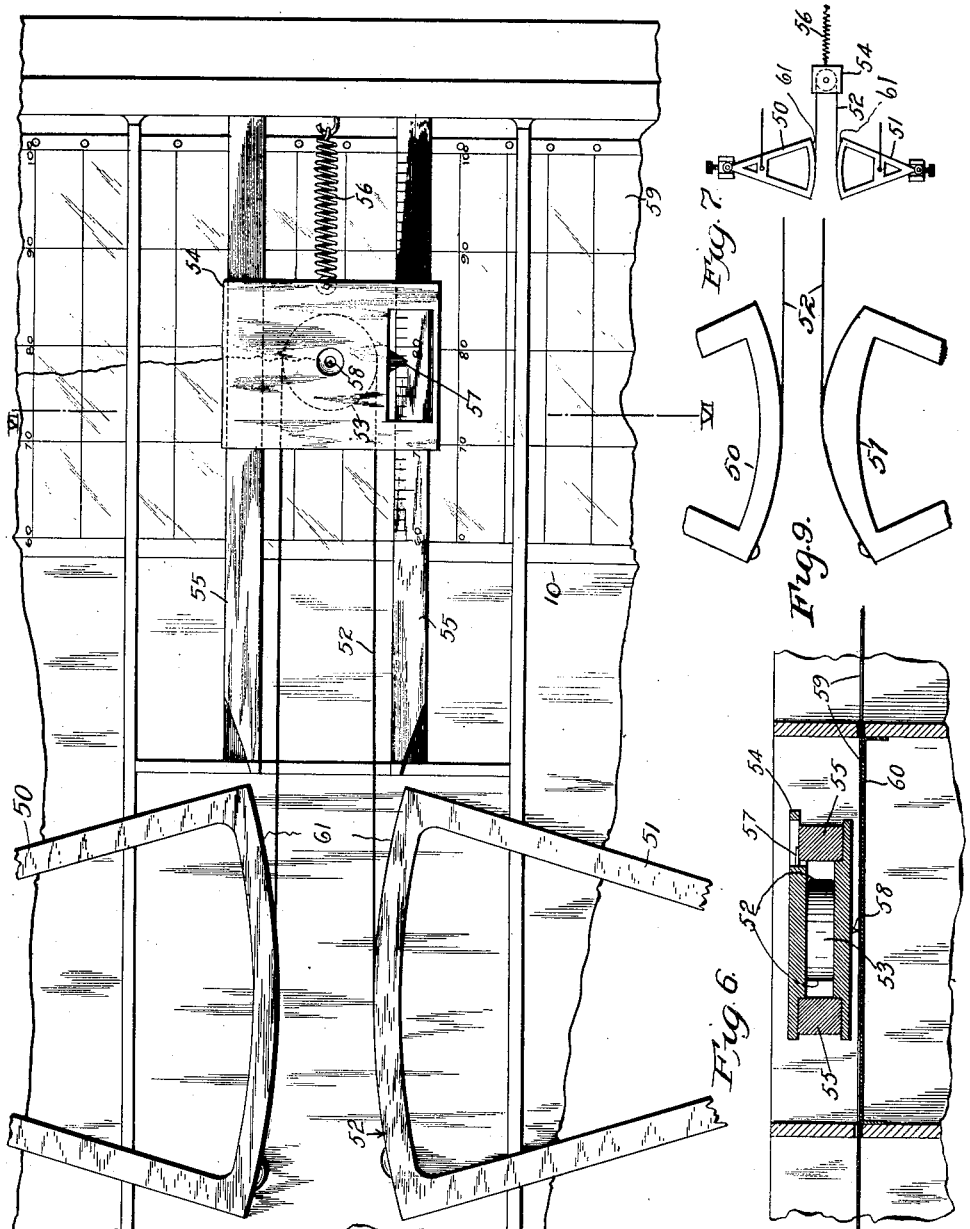

UNITED STATES PATENT OFFICE.

WILLIAM B. HODGE, OF CHARLOTTE, NORTH CAROLINA.

APPARATUS FOR INDICATING AND REGULATING HUMIDITY.

1,080,109.  Specification of Letters Patent.  Patented Dec. 2, 1913.

Application filed February 7, 1913. Serial No. 746,794.

*To all whom it may concern:*

Be it known that I, WILLIAM B. HODGE, of Charlotte, in the county of Mecklenburg and State of North Carolina, have invented the following-described Improvements in Apparatus for Indicating and Regulating Humidity.

The invention is an improvement in instruments for automatically regulating, indicating or recording humidity and temperature, and consists in the means and method of coördination of wet and dry bulb thermo-expansive elements hereinafter explained, whereby certain various useful effects are produced and more especially whereby the degree of humidity in cotton or textile establishments can be maintained or regulated in accordance with the percentage of moisture desired to be present in the textile fiber.

It being a fact that the percentage of moisture absorbed or retained by a given fiber is always the same under the same combination of temperature and relative humidity conditions, but varies when either of the two factors of such combination changes, the present invention provides means whereby the amount of moisture actually in the fiber during its process of manufacture can be visually ascertained without reference to the fiber itself, and whereby the relative humidity of the room can be automatically varied throughout changing conditions to preserve in the fiber a substantially constant percentage of moisture; that is to say, whereby an amount of moisture equal to a constant percentage of the weight of the fiber can be maintained in it. This effect is not possible to be produced by maintaining merely a constant relative humidity in the mill room, because as stated the fiber will absorb more moisture at higher than at lower temperatures, the relative humidity remaining the same or, more at high than at low relative humidities, the temperature remaining the same.

The drawings herein show an illustrative type of apparatus capable of operation to produce the effect stated, though capable also of adjustment to indicate or maintain conditions of constant relative humidity, if desired.

Figure 1:
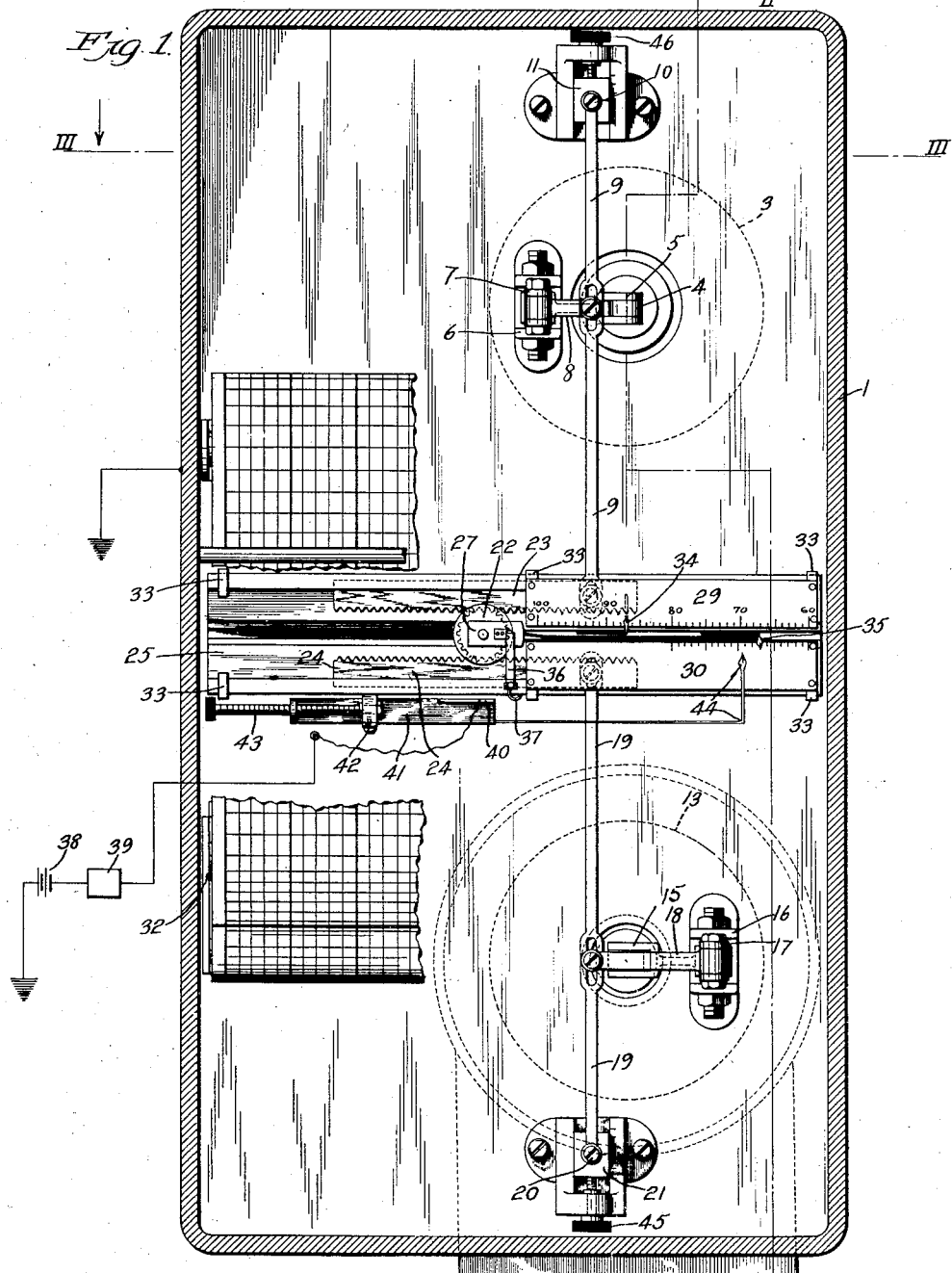
Figure 2:
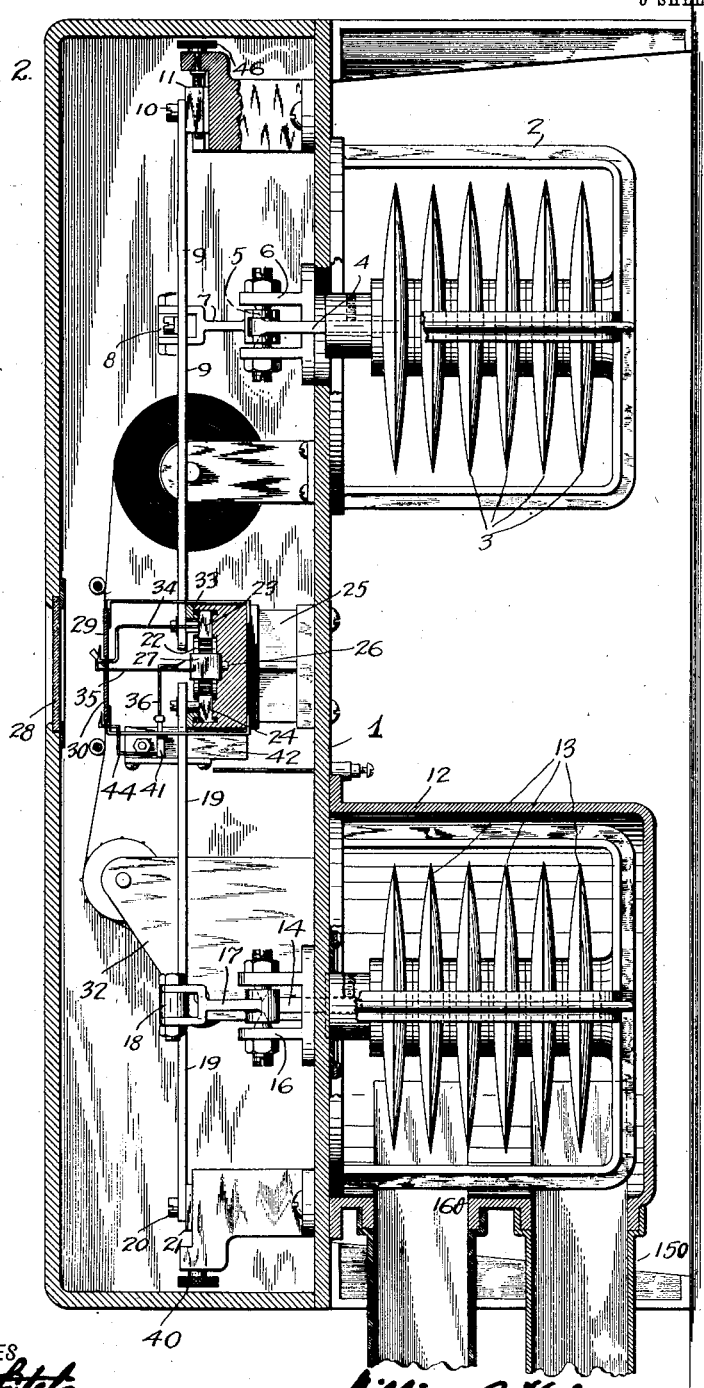
Figure 3:
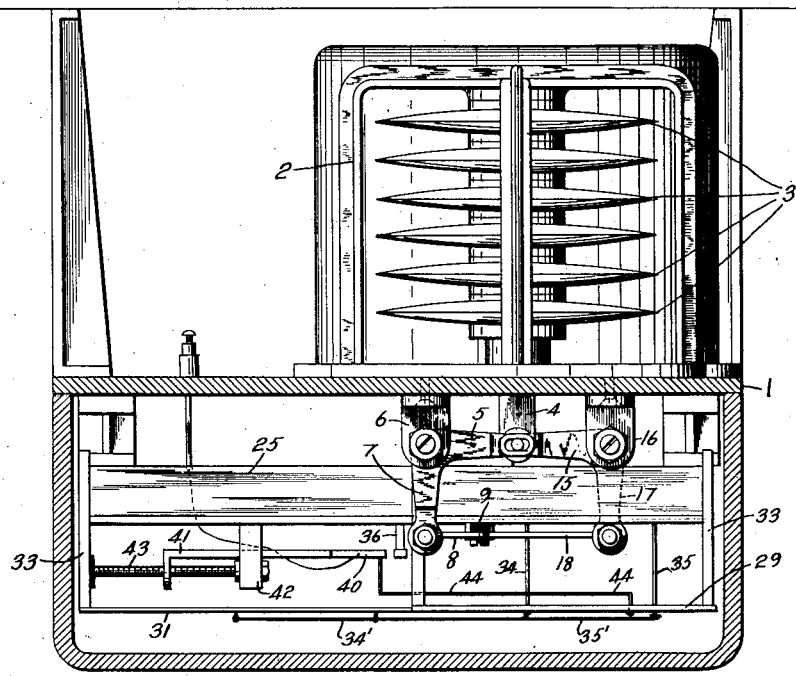
Figure 8:
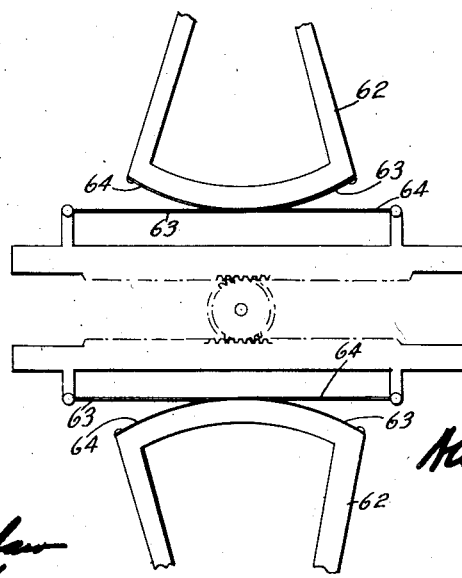

In these drawings, Figure 1 is a front elevation of one form of such instrument, with parts broken out and shown in section for sake of clearness. The platen of the recording apparatus is removed from this figure to expose the parts in rear. Fig. 2 is a vertical section of Fig. 1, on line II—II. Fig. 3 is a top plan of Fig. 1, with parts in section on line III—III and clock mechanism removed. Fig. 4 is an enlarged front elevation of the window of the instrument illustrating the recording sheet and the scale plates as viewed when the instrument is set up for operation. Figs. 5, 7 and 8 represent modified forms, and Fig. 6 is a section of Fig. 5 on line VI—VI. Fig. 9 is a schematic illustration of a modification.

The instrument comprises a suitable support in the form of a box or casing 1, adapted to be fastened to an upright wall or post in the room which it is to control, or the temperature conditions of which it is to indicate or record. At the rear of the upper part of the casing there is secured a skeleton frame 2 in which is mounted a thremo-expansive element 3, and which is thus adapted to indicate or respond to the temperature of the room air being therefore termed the dry-bulb element of the instrument. This element may consist of several flexible walled containers in the form of expansible hollow disks or cells 3 partly or wholly filled with some thermo-expansive fluid, liquid or gas, or both, that is subject to rapid expansion and contraction in volume under changing temperature, such as ether or alcohol. When several of these containers are used, as in the present case, they are so arranged in series that each acts cumulatively with the others and the expansion of the series is the aggregate of the individual expansion of each. As many of these cells may be provided, depending on their size, as may be necessary to provide the force or motion required for properly moving the parts connected to them, and as later explained, they are desirably selected so that each is equal to the others in its extent and rate of expansion. The container at one end of the series is permanently fixed to the back part of the frame 2, while the other end is provided with a stem 4 representing the active end of the series. This stem, which may be adjustable with reference to the terminal container as indicated in Fig. 2 for the purpose of setting the instrument to a desired standard, projects through the back wall of the casing 1, and engages one arm 5 of a bell-crank which is journaled in a bearing stand 6. The other arm 7 of the bell-crank is connected through a link 8 with a lever 9. The latter lever is fulcrumed on a stud 10 which is carried by an adjustable slide block 11 at the top of the casing, as shown in Fig. 1. Expansion of the thermo-expansive element 3 operates through the connections just described to swing the lever 9 toward the left in Fig. 1. The stem 4 is made adjustable with reference to the terminal container by a telescopic connection with a part or projection on said container, the adjustment being secured by means of a set screw, as indicated in Fig. 2, which is tapped into one member of the telescopic joint and bears against the other, i. e., against the stem 4.

At the rear of the lower part of the casing 1, there is formed or secured a chamber 12, in which there is mounted a bank or series of containers or cells 13 similar to the cells 3 and similarly arranged, the terminal cell being provided with a stem 14, which like the stem 4, represents the active member of that bank or series. This thermo-expansive element is the wet-bulb element of the instrument and is to be exposed to a different temperature condition, as, for instance, the temperature of evaporation of water, which may be applied to it in any proper manner but preferably by passing through the lower compartment a current of saturated or super-saturated air. For this purpose entrance and exit conduit connections 150 and 160 are connected to the bottom of the chamber, as shown in Fig. 2, to provide a circulation of such saturated air through the said chamber.

The stem 14 projects forwardly through an aperture in the back wall of the casing 1, which aperture is made tight against leakage by a suitable annular packing washer fitted around and engaging the projection on the terminal container, as shown. The stem 14 is telescopically and adjustably secured in the container projection by means of a set screw, as in the case of the dry bulb element, and inside of the main casing is connected with the arm 15 of a bell-crank journaled in the bearing stand 16, the other arm 17 of said bell-crank being connected through a link 18 with a lever 19. The latter lever, like the lever 9, is fulcrumed on a stud 20 of a movable slide block 21 located at the lower end of the casing, as shown in Figs. 1 and 2. Expansion of the wet-bulb thermo-expansive element 13, through the connections described, causes the wet-bulb lever 19 to swing toward the right in Fig. 1 or oppositely to the corresponding expansion of the dry-bulb lever 9. The motions of these two levers are thus in accordance with the changes in the temperature to which the dry and wet bulb elements are subjected, and though opposite in effect, are both imparted or transmitted to a common part or member herein termed the differential connector since its function is to connect the two expansion elements and resolve the motions received from each into a resultant or differential motion of its own. In Figs. 1 to 3 this connector is a shrouded spur-pinion 22 in mesh on its opposite sides with two slide-racks 23 and 24, respectively, the former rack being connected by pin and slot to the end of the dry-bulb lever 9, and the latter rack with the corresponding slotted end of the wet-bulb lever 19. The two racks may be T-shaped in cross-section, as shown in Fig. 2, and confined to slide in suitable slideways formed in the bracket support 25. The pinion 22 is held in place and in mesh with each rack by its shroud flanges. It will be observed that unequal rack motions resulting from simultaneous expansion or contraction of the two thermo-expansive elements will produce bodily displacement of the differential pinion 22, according to the difference of such motions, while equal rack motions will produce merely the rotation of the pinion without bodily displacement. The axle 26 of the pinion may be utilized as the means of translating the bodily movement or position of the pinion into some useful effect, as, for instance, into a visual indication or a permanent record, or into the automatic control of the humidity or temperature conditions affecting the room in which the instrument is used. In the present exemplification it is utilized for all of these effects but as the axle is subject to rotation and is hence difficult of direct attachment to other parts, its bodily movement is utilized through the intervention of a carriage, in which the axle is held or journaled. This carriage is formed of a yoke 27, which embraces the differential connector pinion 22 between the slide-racks and is itself guided to move in an appropriate straight channel or way formed in the part 25, being held to such channel by the pinion which it embraces. This yoke or carriage therefore represents the means for translating the resultant or differential movement of the two thermo-expansive elements of the instrument, in place of the axle or axis of the pinion, and will be referred to in this specification and in the claims as the translating device or the means for translating the differential motion or effect of the two thermo-expansive elements, it being in the present case the direct support for the pointer and the recording pen of the indicating and recording mechanism as well as of the device through which the humidity conditions are altered or controlled corresponding to such indications, as will be presently explained.

The body of the casing of the instrument is removable from the back plate and contains a window 28 in front of and adapted to expose the two scale plates 29 and 30 and also the recorder platen 31 when the same is not covered by the recorder paper.

The platen shows in edge view in Fig. 3. The two scale plates are mounted one slightly above the other at the right-hand side of the window, as shown in Figs. 1 and 4 and also in Fig. 2, while the platen 31 is disposed at the left-hand side of the window in substantially the same vertical plane as the scale plates and in a position to support the recorder paper which is traversed thereover by means of clock mechanism. The latter is represented more or less diagrammatically by 32 in Fig. 1, together with the usual rollers and guides. It forms no part of the present invention and is therefore not described further than to state that it is mounted within the main casing at one side of the levers and is readily accessible for winding and exchange of paper. Its function is to draw the paper over the platen at a uniform rate and in accordance with the horizontal time calibrations on the paper, as will be understood. A series of appropriate bracket arms 33 extending forwardly from the support or bracket 25, serves to support the scale plates and also the platen in their positions. The upper scale plate 29 being a temperature scale is intended for coöperation with a pointer 34 carried on or actuated by the upper slide-rack 23 which is connected as above explained with the dry-bulb element 3. This pointer is secured to the right-hand end of the rack 23 and extends forwardly horizontally therefrom and around the under side of the scale plate, at which point it is provided with a branch arm 34¹ (see Fig. 4) extending laterally and horizontally to a point over the platen 31 where it carries a recording pen adapted to trace a mark upon the recorder sheet traveling thereon. When the instrument has been properly adjusted, the pointer 34 will indicate the temperature to which the dry bulb member is subjected and its recording pen will indicate a like temperature on the scale divisions of the traveling recorder sheet.

The translating means 27 carries a similar pointer 35 extending horizontally therefrom, laterally and then forwardly, to a point where it turns down over the top edge of the lower humidity scale 30, at which point it likewise carries a laterally branched arm 35¹ (Fig. 4) and a recording pen, also overlying the traveling recorder sheet on the platen 31. The position of this pointer and its corresponding pen will indicate a certain differential of the temperatures which jointly affect the wet and dry bulb elements, as will be evident and as later explained. The said translating device 27 further carries a member 36 representing the movable member of the humidity-controlling device above referred to, that is to say, a device or means adapted to control, either mediately or immediately, the valve or mechanism that supplies moisture, or changes the humidity conditions in the room to be regulated so as to increase or decrease the moisture therein. In the present instance this member 36 is an arm projecting forwardly and downwardly from the translating device 27 and carrying a wiper contact 37 adapted to close and open a suitable circuit so as thereby to bring into and out of operation an auxiliary source of power, such as the electrical source indicated at 38 in Fig. 1, for the purpose of actuating a water, steam or other moisture-controlling valve, diagrammatically represented at 39. Such valves are common in the art and will not require description or detail illustration. The arm 36 is in electrical connection through the translating device with the frame which is indicated as grounded, while the other pole of the source 38 is connected to an insulated contact plate 40 on a slide 41 which is mounted in a support 42 on the under side of the bracket 25. The contact plate 40 is disposed in the path of the movable wiper and is adjustable therein by means of an adjustment screw 43 so that it can be set at different positions along the said path, to be engaged by the wiper at any predetermined point. The contact 40 carries an arm 44 extended horizontally therefrom, laterally and forwardly, to a point at which it is turned up in front of the humidity scale 30 where it can be used with reference to the calibrations thereof, as shown more clearly in Fig. 4. This pointer serves as a guide or index wherewith to determine and set the point of engagement of the contact 40 by the contact wiper. In place of such electrical means above described, it will be evident that the translating device 17 can be used to control the humidity conditions in various other ways, as, for instance, by controlling the vent of an air line instead of an electric contact.

In the operation of the instrument the index pointer 44 is set at a predetermined position on the scale 30, which will set the contact 40 at a corresponding point in the path of travel of its wiper. If now the dry bulb element is subjected to the dry bulb temperature of the air and the wet bulb element to the wet bulb temperature of the air in the room to be regulated, the differential connector pinion 22 will assume a corresponding position representing the resultant of the joint operations of the two expansive members. Such position of the connector will be represented by the position of the translating device 27, say, as shown by the pointer 35 in Fig. 4, its pen and the wiper 37 being stationed accordingly. If then the humidity changes in such manner as to produce movement of the translating device 27 to the left, the contact wiper will approach the contact 40 and will contact therewith when the pointer registers with the index pointer 44. The circuit thereby closed and the ensuing operation of the valve 39 will thereupon operate in a known manner to change the moisture conditions so as to counteract the tendencies toward further movement of the pointer to the left and in this manner will maintain conditions through the control of valve 39 which will keep the wiper playing on and off of the contact plate as will be readily understood; that is to say, will keep the conditions of humidity substantially constant at the point or degree represented by the location of the index pointer 44 on the scale 30. In the meantime the pointer 35 will indicate visually on the same scale such fluctuations as may take place and its pen will inscribe such fluctuations or any changes in the setting as a permanent record on the clock-driven recorder sheet. The action will obviously be the same whether electrical or other agency is used for transmitting the control to the valve 28, or whether the expansive and contractile force of the elements themselves be imparted immediately to the operation thereof.

By the described arrangement of the parts the linear motion imparted to the upper rack 23 may be the same as or different from that imparted to the other rack 24 per degree change of temperature of their respective expansion elements. When the total leverage ratio between the elements and their corresponding racks is the same, the equal but opposite linear motion thereby imparted to the slide racks will result in a resultant movement of the differential pinion that will correspond, with substantial precision for ordinary purposes, to the rate of change of the relative humidity in the room the air of which affects the expansion elements. But as the textile fiber, cotton for instance, will absorb a larger percentage of moisture from air of a given degree of relative humidity and a relatively high temperature (dry bulb) than it will from the same air having the same relative humidity and a lower (dry bulb) temperature, the conditions established automatically by the differential connector will not be such as to maintain always a substantially constant percentage of moisture in the cotton nor will the position of such connector accord with a scale of such percentages. I have ascertained, however, that by giving the wet bulb rack a certain predominance of motion over the other, per degree of temperature change, the resulting position and movements of the connector will substantially correspond to the per cent. of moisture that cotton will absorb from air whose wet and dry bulb temperatures are affecting the two expansive elements, provided only that such elements have substantially equal and constant coefficients of expansion. As above described these elements are desirably made of a series of many cells or containers each containing the same thermo-expansive medium, so as thereby to give a coefficient which, being an average of all, is practically the same and constant as respects both the wet and dry bulbs, at least for temperatures ordinarily encountered. The proper predominance of the wet bulb motion can be obtained by making the leverage ratio by which the wet bulb actuates the differential connector compare to that by which the dry bulb element actuates it, as 19 to 20, that is to say, by so proportioning the motion transmitting elements as to give substantially 20 units of motion to the lower slide rack and only 19 to the upper rack for each degree of temperature change of their corresponding expansive elements. In Figs. 1 to 4 of the drawings such relationship is attained by setting the fulcrum of lever 19 closer to the bell-crank connection which can be done by the obvious operation of the screw 45 with reference to the scale shown, or it can be done by an opposite adjustment of the screw 46 which controls the position of the dry bulb lever's fulcrum, which however is more particularly useful in setting the dry bulb indications to conform to the scale calibrations.

In the modified instruments of Figs. 5 to 8, I have shown a construction employing the same general instrumentalities but capable of operation even more closely in accordance with the condition of the fiber. The levers with the adjustable fulcra of the preceding form are substituted by sector levers 50 and 51, and the racks and differential spur pinion of that form by a cord or thin steel band 52, which is connected by one end to one sector and by the other to the other, with its middle portion trained around a pulley 53. The latter is mounted in a carriage 54 which is the translating device of this form and is mounted to slide on suitable ways 55, being gently urged in the direction to keep the band taut by a spring 56. The two sector levers are respectively subject to motion by wet and dry bulb elements the same as before and impart such individual motion to the differential pulley in an obvious manner, moving it with a differential or resultant motion. To the pulley or its carriage 54 may be attached a pointer 57 or a contact wiper or any usual means of effecting automatic control of the moisture conditions, either mediately or immediately, as desired, and of course a recorder pen such as indicated at 58, can also be attached to trace a mark on the recorder sheet 59 beneath it. The platen for the recorder sheet is marked 60 in Fig. 6, but the clock mechanism is not shown. The sector shape of the levers affords the opportunity of determining a variable relation between the effects of the expansive motions of the two expansive elements in addition to the control possible by the adjustable fulcra so as to make the translating device move more or less in exact proportion to the change in the actual percentage of moisture absorbed by the textile under varying temperatures and humidity. For this purpose the terminal surface 61 of one or both levers is formed of special curvature which may be determined empirically, as for instance by making such surfaces first circular and concentric to the pivot, and then after determining the error produced by such construction, plotting the curve of such error and applying or superposing a compensating curvature upon the circular surface or surfaces. The drawings herein do not attempt to illustrate an appropriate sector curvature inasmuch as the variation from circular arc is only slight and obviously depends upon the nature of the thermo-expansive medium employed in the wet and dry bulb elements. In Fig. 9 I have shown, schematically merely, a form of curvature which will modify the differential action of the elements, and indicate the character of curvature variation referred to. When such elements are constituted of a multiplicity of individual members, however, so that they can thus be manufactured with reasonable uniformity of action a definite curvature for such aggregations of members is readily applied thereby in great measure avoiding the need of special calibration of each instrument.

With the straight levers of the form first described the scale calibrations would be irregular unless the particular coefficient of expansion of the expansive medium in the containers should be such as to produce of itself the necessary compensation. The figures of the drawing do not attempt to illustrate the scale calibrations in the precise relationship which might happen to be suited to this instrument and it will be understood they can be best made by comparison with the actual conditions as determined by standard measuring devices. The same principle of control can be further utilized without the tension spring by connecting the sector levers with the slide racks in the manner shown by Fig. 8. Here the sector levers 62 engage their respective racks by means of two crossing bands 63 and 64 secured to opposite ends of the sector and the rack respectively and by which, as will be evident, the rack is positively moved in both directions by the thermo-expansive element which acts on the sector lever. The racks in this case are intended to be geared to a differential spur pinion of the same construction and having the same translating means as shown for Fig. 1 and it will be understood that the levers on the wet and dry bulb sides are related to each other as above explained, and may also and in addition have the special compensating curvature. It will be further observed that by the utilization of racks with rectilinear movement as just described, the dry bulb rack may be utilized also, as in Fig. 1, for giving temperature indications on a straight scale, which is sometimes desirable.

I claim:

1. In apparatus of the kind described, the combination of a differential connector operated by wet and dry bulb thermo-expansive elements, and receiving relatively greater motion per degree of temperature change from the wet bulb element than from the dry bulb element, whereby such connector moves substantially in proportion to the change in the percentage of moisture that will be held by cotton under changing conditions of relative humidity and temperature, and suitable means for translating the resultant motion of the said differential connector.

2. In apparatus of the kind described, the combination of wet and dry bulb thermo-expansive elements, a differential connector therebetween independently operated by each of such elements and receiving relatively greater motion, per degree of temperature change, from the wet bulb element than from the dry bulb element, whereby the resultant movement of such connector is in substantial proportion to the change in the percentage of moisture that will be held by cotton under changing conditions of temperature and relative humidity and suitable means for translating such resultant movement.

3. In apparatus of the kind described, the combination of wet and dry bulb thermo-expansive elements, a differential connector receiving motion from each of such elements and resolving such motion into a resultant movement of its own, a lever connecting each of such elements with such connector to impart such movement thereto, and means for translating the resultant movement of the said connector.

4. In apparatus of the kind described, a differential connector suitably arranged for coördinating two independent motions imparted to it, a lever for imparting one of such motions and adapted to be moved in accordance with dry bulb temperature changes of the air, a separate lever for imparting the other of such motions and adapted to be moved in accordance with wet bulb temperature changes of the air, and means for translating the resolution of such motions by the said differential connector, the proportion of the movement imparted by the dry bulb lever being to that imparted by the wet bulb lever substantially as 19 to 20.

5. In apparatus of the kind described, the combination of wet and dry bulb thermo-expansive elements, a differential connector, levers connecting both elements with the connector and operating thereon respectively through different leverage ratios whereby such connector receives a bodily resultant movement, and means for translating such movement.

6. In apparatus of the kind described, two levers of different lengths, means for moving each according to changes of the wet bulb and dry bulb temperatures respectively, a differential connector connected to receive motion from each lever and adapted to resolve the same into a resultant differential movement of its own, and means for translating such resultant movement.

7. In apparatus of the kind described, the combination of wet and dry bulb thermo-expansive elements, a translating device moved by the differential action of said elements and receiving relatively greater motion from the wet bulb element, per degree of temperature change, than from the dry bulb element, the proportion of such different motions being substantially as 20 to 19.

8. In apparatus for conditioning fiber, the combination of wet and dry bulb thermo-expansive elements, a differential connector and humidity-controlling device subject to motion by each of said elements, and means for imparting such motion to said device comprising operating connections arranged to multiply the motion imparted by the wet bulb expansion relatively to that by the dry bulb expansion in the proportion of substantially 20 to 19, whereby the movement of the said controlling device will be substantially proportioned to the percentage of moisture retained by cotton under changing conditions of temperature and relative humidity.

9. In apparatus of the kind described, the combination of wet and dry bulb thermo-expansive elements, a suitable translating device, and differentially-active gearing by which the expanding or contracting movement of said element is imparted to said translating device, the said gearing being proportioned to increase the effect of the wet bulb expansion over that of the dry bulb expansion in substantially the proportion of 20 to 19.

10. In apparatus of the kind described, a differential connector and a translating device therefor which is moved by the said connector, wet and dry bulb thermo-expansive elements, and means whereby such elements can impart their expansion or contraction movements, differentially, to said connector and through the latter to said translating device, such means including a lever through which one of said elements acts and means for varying the leverage ratio of this lever.

11. In apparatus of the kind described, a differential connector, two levers through which such connector is actuated and wet and dry bulb thermo-expansive elements for operating the levers respectively, in combination with means for varying the effective length of one lever with reference to the other, and means for translating the movement of the connector.

12. In apparatus of the kind described, wet and dry bulb thermo-expansive elements each comprised of a connected aggregation of substantially similar expansive elements, a suitable translating device and means for imparting the differential effect of the expansions of such elements to the said device arranged to multiply the effect of the wet bulb thereon relatively to that of the dry bulb in the substantial proportion of 20 to 19.

13. In apparatus of the kind described, wet and dry bulb thermo-expansive elements, a differential connector therebetween, adapted to receive a relatively larger motion from the wet bulb element than from the dry bulb element and resolve such motions into bodily movement of its own, means for varying the relative proportions of such motions per degree of temperature change, and means for also varying the initial position of said connector with reference to one of the thermo-expansive elements.

14. In apparatus of the kind described, wet and dry bulb thermo-expansive elements, lever members connected with each of said elements, a differential connector between said lever members, adapted to resolve the motions of each into resultant bodily motion of its own, a carriage for such connector, a straight way in which said carriage moves, and indicating means on said carriage.

15. In apparatus of the kind described, wet and dry bulb thermo-expansive elements and means for coördinating their individual expansions comprising a differential connector and translating device resolving such expansive motions into a differential resultant movement, in combination with motion-imparting connections between the said device and one of said elements including a curved surface the curvature whereof modifies the differential action of said elements upon the said translating device.

In testimony whereof, I have signed this specification in the presence of two witnesses.

WILLIAM B. HODGE.

Witnesses:
Jno. C. Watson,
K. W. Selden.